(12) United States Patent
Foote (10) Patent No.: US 11,987,224 B1
(45) Date of Patent: May 21, 2024

(54) AERODYNAMIC VEHICLE WHEEL AIRFOIL AND ASSOCIATED METHOD(S)

(71) Applicant: Harold Foote, Bonita Springs, FL (US)

(72) Inventor: Harold Foote, Bonita Springs, FL (US)

(*) Notice: Subject to any disclaimer, the term of this patent is extended or adjusted under 35 U.S.C. 154(b) by 0 days.

(21) Appl. No.: 18/463,640

(22) Filed: Sep. 8, 2023

Related U.S. Application Data (60) Provisional application No. 63/380,390, filed on Oct. 21, 2022.

(51) Int. Cl.
*B60T 5/00* (2006.01)
*B60B 1/06* (2006.01)

(52) U.S. Cl.
CPC ............... *B60T 5/00* (2013.01); *B60B 1/06* (2013.01); *B60B 2900/513* (2013.01)

(58) Field of Classification Search
CPC .. B60T 5/00; B60B 1/06; B60B 19/10; B60B 7/0086; B60B 2900/513; F16D 65/128
See application file for complete search history.

(56) References Cited

U.S. PATENT DOCUMENTS

| | | | |
|---|---|---|---|
| 9,302,538 B2 * | 4/2016 | Smart | B60B 25/00 |
| 11,110,745 B2 * | 9/2021 | Mercier | B60B 27/04 |
| 11,713,111 B2 * | 8/2023 | Francis | F16D 65/847 |
| | | | 244/103 R |
| 2021/0206199 A1 * | 7/2021 | Baigh | F04D 29/388 |
| 2022/0135008 A1 * | 5/2022 | Ke | B60T 5/00 |
| | | | 188/264 R |

OTHER PUBLICATIONS

German Patent No. DE 102012022624 to Plohmann published on May 22, 2014.*
European Patent No. EP 3650243 to Biancalana et al published on May 13, 2020.*

* cited by examiner

*Primary Examiner* — Pamela Rodriguez
(74) *Attorney, Agent, or Firm* — Ashkan Najafi (57) ABSTRACT

A vehicle wheel includes a vehicle rim having a central hub, and a plurality of vehicle airfoil struts connected to the central hub and being extended radially outwardly therefrom. Such vehicle airfoil struts are equidistantly spaced about the central hub. Each of the vehicle airfoil struts has a central longitudinal axis extended radially away from the central hub and includes a leading section facing forward and having a first curvilinear surface provided with a first radius of curvature facing a rotation direction of the vehicle rim, and a trailing section facing rearward and having a second curvilinear surface provided with a second radius of curvature opposing the rotation direction of the vehicle rim. The first radius of curvature is greater than the second radius of curvature.

18 Claims, 7 Drawing Sheets

AERODYNAMIC VEHICLE WHEEL AIRFOIL AND ASSOCIATED METHOD(S)

CROSS REFERENCE TO RELATED APPLICATIONS

This is a non-provisional patent application that claims priority to and benefit of U.S. provisional patent application No. 63/380,390 filed Oct. 21, 2022, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to airfoils and, more particularly, to a specially configured aerodynamic land vehicle wheel including airfoil struts for reducing burbling and efficiently channeling airflow to cool a vehicle brake thereby improving brake efficiency and a useful life thereof (reducing heat, wear, and tear on the vehicle brake).

Prior Art

Many braking systems include a rotor attached to one or more of the vehicle wheels for rotation therewith, and a caliper assembly secured to a non-rotating component of the vehicle, such as the vehicle frame. A typical rotor includes an annular peripheral section having frictional surfaces disposed on opposite sides and a central hub or central hub having fasteners for securing the wheel thereto. The caliper assembly typically includes a pair of brake pads disposed adjacent to the rotor friction surfaces, and a movable piston operatively connected to one or more of the brake pads. When the driver brakes the vehicle, hydraulic, electric, or pneumatic forces move the piston, which clamps the pads against the friction surfaces of the rotating rotor. As the brake pads press against the moving rotor friction surfaces, frictional forces are created that oppose rotation of the wheel and slow or stop the vehicle.

The frictional braking forces generate heat that is absorbed by the rotor, increasing the temperature of the rotor, causing thermal expansion/distortion, temperature variation across the face of the rotor, and heat transfer to the adjacent components. When the rotor is fixed with respect to the wheel hub, thermal expansion of the rotor is limited because of the integral connection between the rotor and the hub. This creates thermal "coning" in the rotor surface and a large thermal gradient, which can induce high thermal stress leading to thermal cracking, and other undesirable non-uniform loading of components.

Therefore, it is important to dissipate the heat and cool the rotor, because excessive rotor temperatures reduce braking performance, creating longer stopping distances, shorten the life of the rotor and/or the friction pads, or even cause braking failure. Rotors are commonly cooled using moving air that absorbs heat from the rotor and carries it away. It is known to "ventilate" rotors by forming holes or vents through the friction surfaces or the central hub of the rotor. As the rotor turns, air is moved through the vents. The moving air absorbs heat and cools the rotor. Cooling the rotor can also prevent rotor coning.

Vehicle brake rotors are commonly used to improve heat transfer for cooling automotive brakes. Airflow efficiency in transferring heat is determined by several factors, including the number of airfoils, airfoil location, airfoil size, and the cross-sectional profile of the airfoils. Conventional airflow geometry often includes straight lines and arcs, which undesirably cause flow separation when air flows through vents.

Another aspect of heat transfer for automotive brakes is minimizing uneven thermal distortion of the rotor plates encompassing the airflow. Uneven distortion, often referred to as "coning," which causes uneven wear of brake pads and rotors, and subsequently sub-optimized brake performance. In conventional rotors, the central hub is connected to either the rotor's outboard disc or its inboard disc. Whichever disc the central hub extends from is cooled more effectively because the friction heat generated in the disc is transferred through the central hub in addition to being cooled by the rotor vents. The other disc is, for the most part cooled only by the vents. Because one disc is cooled more effectively, the discs have an uneven heat distribution and therefore uneven thermal distortion from heat, resulting in coning.

Moreover, airfoil shape and length must vary with airspeed to prevent "burbling" (disruption in the air exiting the airfoil creating a stall and the loss of the high speed air needed for cooling).

Accordingly, a need remains for specially configured aerodynamic vehicle wheel including airfoil struts in order to overcome at least one of the above-noted shortcomings. The exemplary embodiment(s) satisfy such a need by a specially configured aerodynamic vehicle wheel including airfoil struts that is convenient and easy to use, lightweight yet durable in design, versatile in its applications, and configured for reducing burbling and efficiently channeling airflow to cool a vehicle brake thereby improving brake efficiency and useful life (reducing heat, wear, and tear on the vehicle brake).

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured aerodynamic land vehicle wheel including airfoil struts for reducing burbling and efficiently channeling airflow to cool a vehicle brake thereby improving brake efficiency and a useful life thereof (reducing heat, wear, and tear on the vehicle brake). These and other objects, features, and advantages of the non-limiting exemplary embodiment(s) are provided by a vehicle wheel for cooling a brake rotor of a vehicle and improving fuel efficiency of the vehicle. Such a vehicle wheel includes a vehicle rim having a central hub wherein the vehicle rim is configured to engage a vehicle tire of a vehicle and is further configured to communicate with a brake rotor of the vehicle, and a plurality of vehicle airfoil struts connected to the central hub and being extended radially outwardly therefrom. Such vehicle airfoil struts are equidistantly spaced about the central hub. Advantageously, each of the vehicle airfoil struts has a central longitudinal axis extended radially away from the central hub and includes a leading section facing forward and having a first curvilinear surface provided with a first radius of curvature facing a rotation direction of the vehicle rim, and a trailing section facing rearward and having a second curvilinear surface provided with a second radius of curvature opposing the rotation direction of the vehicle rim. Advantageously, the first radius of curvature is greater than the second radius of curvature. Advantageously, the leading section has a rectilinear leading edge extended parallel to along the central longitudinal axis. Advantageously, the trailing section has a rectilinear and planar trailing edge extended parallel to along the central longitudinal axis and the rectilinear leading edge. Advantageously, the rectilinear and planar trailing edge has a cross-sectional thickness less than a cross-sectional thickness of the rectilinear leading edge. Advantageously, the leading section and the trailing section are configured to channel airflow towards the brake rotor and cool the brake rotor as well as improve fuel efficiency of the vehicle. Advantageously, the first radius of curvature and the second radius of curvature are configured to channel airflow towards the brake rotor and cool the brake rotor as well as improve fuel efficiency of the vehicle.

In a non-limiting exemplary embodiment, the vehicle rim is a land vehicle rim.

In a non-limiting exemplary embodiment, the vehicle airfoil struts are land vehicle airfoil struts.

In a non-limiting exemplary embodiment, each of the vehicle airfoil struts includes an angle of attack less than or equal to 10 degrees.

In a non-limiting exemplary embodiment, each of the vehicle airfoil struts includes an angle of attack greater than 10 degrees and less than or equal to 30 degrees.

In a non-limiting exemplary embodiment, each of the vehicle airfoil struts includes an angle of attack greater than 30 degrees and less than or equal to 45 degrees.

In a non-limiting exemplary embodiment, each of the vehicle airfoil struts includes an arcuate top surface and an arcuate bottom surface opposed therefrom. Advantageously, the top surface having a greater surface area and surface area length than the bottom surface.

In a non-limiting exemplary embodiment, each of the vehicle airfoil struts further includes a distal end directly coupled to a circumferential inner perimeter of an outer portion of the vehicle rim, and a proximal end being directly coupled to a circumferential outer perimeter of the central hub.

In a non-limiting exemplary embodiment, the arcuate top surface is smooth and continuously extends along both the leading section and the trailing section. Advantageously, the arcuate bottom surface is smooth and continuously extends along both the leading section and the trailing section.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-14 and is/are intended to provide a specially configured aerodynamic land vehicle wheel 20 including airfoil struts 21 for reducing burbling and efficiently channeling airflow 55 to cool a vehicle brake thereby improving brake efficiency and a useful life thereof (reducing heat, wear, and tear on the vehicle brake rotor 22).

Advantageously, a leading section 27 of the airfoil strut 21 faces the direction of vehicle rim 23 rotation with the greater curved section 27 facing forward and the lesser curved (flatter) section 30 in the rear, both relative to a rotation direction 51 of the vehicle rim 23. The most efficient structure for miles per gallon (MPG) improvement is at high speed where conventional MPG typically deteriorates. Also, fewer larger struts with a fairly low angle (less than 45 degrees) of attack provides greater "lift" to boost vehicle rim 23 rotation.

A non-limiting exemplary embodiment(s) of the present disclosure is referred to generally in FIGS. 1-14 and is intended to provide a specially configured aerodynamic vehicle wheel 20 including airfoil struts 21 for reducing burbling and efficiently channeling airflow 55 to cool a vehicle brake rotor 22 thereby improving brake efficiency and useful life (reducing heat, wear, and tear on the vehicle brake). It should be understood that the exemplary embodiment(s) may be used with a variety of vehicle brake systems and should not be limited to any particular vehicle brake system described herein.

The term "vehicle" includes a variety of manual vehicles and automobile vehicles that use a vehicle rim 23 and friction-inducing brake rotor 22 for inducing and halting rotary motion of the vehicle rim 23 on a land surface.

The term "wheel" includes a vehicle rim 23 and airfoil struts 21 connected thereto, and does not include a vehicle tire (e.g., rubber vehicle tire).

Referring to FIGS. 1-14 in general, in a non-limiting exemplary embodiment(s), each aerodynamic vehicle wheel 20 airfoil strut has a leading section 27 that is more arcuate than a trailing section 30 of its body. Thus, airflow 55 must travel farther along the leading section 27 to pass across airfoil strut 21. As a result, such airflow 55 travels faster along the leading section 27 and creates a lower air pressure on the top surface 40 of the airfoil strut 21. Normal air pressure exists along the bottom surface 41 of the airfoil strut 21. The high speed airflow 55 along the top surface 40 of the airfoil strut 21 is channeled towards the brake rotor 22 thereby cooling the brake rotor 22, improving their efficiency and useful life (not wearing down the brake rotor 22 and maintaining minimum brake rotor 22 and pad sizes).

In a non-limiting exemplary embodiment(s), airfoil shape and length must vary with airspeed to prevent "burbling" (disruption in the air exiting the airfoil strut 21 creating a stall and the loss of the high speed air needed for cooling). Thus, airfoil struts 21 at the outer circumferential surface of the wheel rim 23 must be flatter and longer than at the central hub 24 because of its relative high speed—the outer part (distal end 45) of the wheel 20 travels much farther than the central hub 24 (proximal end 47) of the wheel. The proximal end 47 of the airfoil strut 21 and any portion of the lower surface 41 of the airfoil strut 21 that do not provide brake rotor 22 cooling can be simply provide mechanical strength. The airflow 55 angle of attack 35 will vary along the airfoil strut 21 as well; increasing modestly as the vehicle descends relative to a ground surface.

Non-limiting exemplary embodiment(s) of the present disclosure provide structural features for improving disc brake heat transfer. For example, the vehicle wheel 20 airfoil struts 21 reduce airflow 55 separation and increase convective heat transfer efficiency. The central hub 24 of vehicle wheel 20 connects to the vehicle brake rotor 22, preferably at a point midway between the inboard disc and the outboard disc. As a result, thermal expansion of the brake rotor 22 is no longer uneven because both discs have the same cooling path as heat is transferred across the inner core of the brake rotor 22—from outer (lateral) side to an inner (medial) side of the vehicle wheel 20. The inner core commonly refers to brake rotor 22 structure that is located between the inner surfaces of the two braking pads.

In a non-limiting exemplary embodiment, airflow 55 passing through the aerodynamic vehicle wheel 20 is greater than conventional vehicle wheels that do not have airfoil struts 21, and the average heat transfer coefficient increases as the vehicle speed increases. This additional capability to dissipate heat from brake rotor 22 will significantly improve rotor cooling and brake performance.

In a non-limiting exemplary embodiment, the airfoil strut 21 maintains laminar airflow 55 passing along the brake rotor 22 and delays transition of air to turbulent flow over the length of the lower surface. Delaying transition to turbulent flow decreases turbulence and minimizes burbling along the top surface 40, which minimizes air flow separation. Because air flow separation decreases overall airflow 55 along the top surface 40, minimizing air flow separation increases air flow along the brake rotor 22 for improved cooling thereof. The arcuately decreasing transition from the leading section 27 to the trailing section 30 enables airflow 55 along the top surface 40 and towards the brake rotor 22 for cooling thereof.

In a non-limiting exemplary embodiment, the vehicle wheel 20 airfoil strut 21 may be constructed, for example, from an iron, aluminum, or metal matrix composition through known methods such as casting. It is preferably cast as a single piece. While the present disclosure is described above with respect to rotors for automotive braking applications, the principles of the present disclosure can be applied, and are contemplated for application, to other devices employing rotors, including airplanes, golf carts, etc.

In a non-limiting exemplary embodiment, the rate of convective heat transfer from brake rotor 22 is directly related to the velocity of air flowing along the brake rotor 22 surface area 42. To optimize the velocity of air flowing along the brake rotor 22 surface area 42, the present disclosure induces a maximum airflow 55 over the expected operating speeds of the vehicle wheel 20 airfoil strut 21. For an automobile, the expected operating speeds of vehicle wheel 20 airfoil may range from twenty mph to one hundred mph. For airplanes and high performance racecars, expected operating speeds of the wheel are much higher. The airfoil struts 21 induce low pressure airflow 55 along the longer surfaces of the airfoil struts 21 and to the brake rotor 22 from the distal circumferential ends of airfoil struts 21, as well as along and around the central hub 24 to the brake rotor 22.

Referring to FIGS. 1-14, in a non-limiting exemplary embodiment(s), vehicle wheel 20 for cooling a brake rotor 22 of a vehicle and improving fuel efficiency of the vehicle, is disclosed. Such a vehicle wheel 20 includes a vehicle rim 23 having a central hub 24 wherein the vehicle rim 23 is configured to engage a vehicle tire (not shown) of a vehicle and is further configured to communicate with a brake rotor 22 of the vehicle, and a plurality of vehicle airfoil struts 21 connected to the central hub 24 and being extended radially outwardly therefrom. Such vehicle airfoil struts 21 are equidistantly spaced about the central hub 24. Advantageously, each of the vehicle airfoil struts 21 has a central longitudinal axis 26 extended radially away from the central hub 24 and includes a leading section 27 facing forward and having a first curvilinear surface 28 provided with a first radius of curvature 29 facing a rotation direction 51 of the vehicle rim 23, and a trailing section 30 facing rearward and having a second curvilinear surface 31 provided with a second radius of curvature 32 opposing the rotation direction 51 of the vehicle rim 23. Advantageously, the first radius of curvature 29 is greater than the second radius of curvature 32. Advantageously, the leading section 27 has a rectilinear leading edge 33 extended parallel to along the central longitudinal axis 26. Advantageously, the trailing section 30 has a rectilinear and planar trailing edge 34 extended parallel to along the central longitudinal axis 26 and the rectilinear leading edge 33. Advantageously, the rectilinear and planar trailing edge 34 has a cross-sectional thickness less than a cross-sectional thickness of the rectilinear leading edge 33 (as perhaps best shown in FIGS. 10 and 11). Advantageously, the leading section 27 and the trailing section 30 are configured to channel airflow 55 towards the brake rotor 22 and cool the brake rotor 22 as well as improve fuel efficiency of the vehicle. Advantageously, the first radius of curvature 29 and the second radius of curvature 32 are configured to channel airflow 55 towards the brake rotor 22 and cool the brake rotor 22 as well as improve fuel efficiency of the vehicle. Such a structural configuration yields the new, useful, and unpredicted result of providing improved brake rotor 22 cooling and creating a lift for improving the vehicle MPG.

In a non-limiting exemplary embodiment, the vehicle rim 23 is a land vehicle rim 23.

In a non-limiting exemplary embodiment, the vehicle airfoil struts 21 are land vehicle airfoil struts 21.

In a non-limiting exemplary embodiment, if the angle of attack 35 is too severe, airflow 55 will not stick to the trailing section 30 airfoil strut 21, burbling will occur, and no lift is produced. Thus, the aircraft stalls and falls out of the sky and the vehicular or aircraft struts 21 will produce no lift; negating their purpose. The higher the speed, the flatter (lesser) the angle of attack 35 must be to produce a lift on the trailing section 30 of the airfoil strut. Because the outer circumferential perimeter of the wheel turns faster than the inner circumferential perimeter near the central hub 24, the angle of attack 35 can be steeper as you approach the central hub 24. But the angle of attack 35 must be quite flat at high speeds, so 10 percent might be suitable at the outer circumferential perimeter of the wheel.

Figure 8:
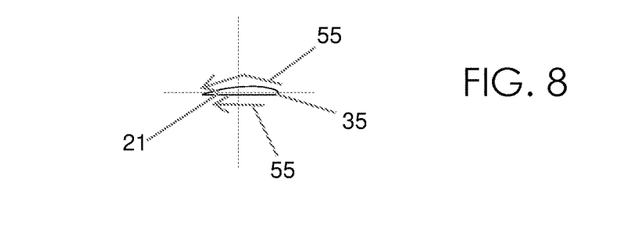
FIG. 8 is a cross-sectional view taken along line 8-8 shown in FIG. 9 for illustrating a zero degree angle of attack of an airfoil strut, in accordance with a non-limiting exemplary embodiment of the present disclosure.
Figure 9:
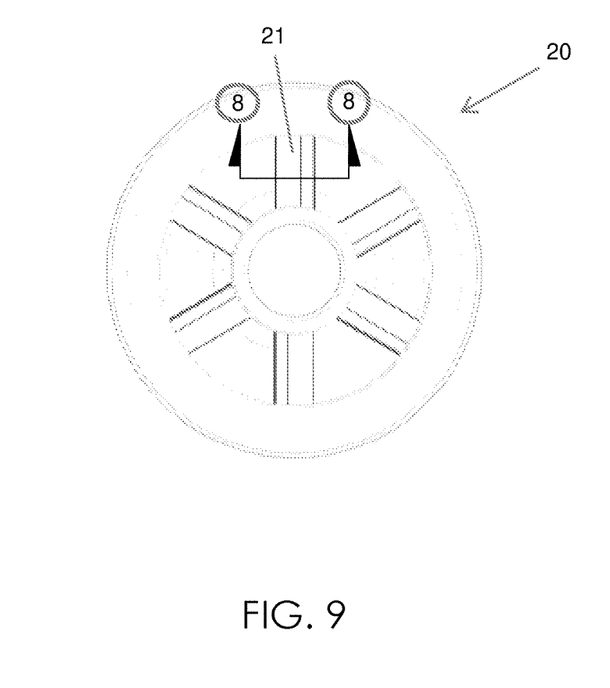
FIG. 9 is a side elevational view of a vehicle wheel including airfoil struts configured with the zero degree angle of attack shown in FIG. 8, in accordance with a non-limiting exemplary embodiment of the present disclosure.
Figure 10:
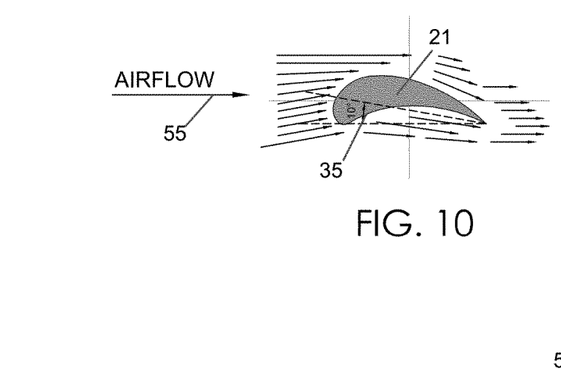
FIG. 10 is a cross-sectional view taken along line 10-10 shown in FIG. 12 for illustrating a 10 degree angle of attack of an airfoil strut, in accordance with a non-limiting exemplary embodiment of the present disclosure.
Figure 11:
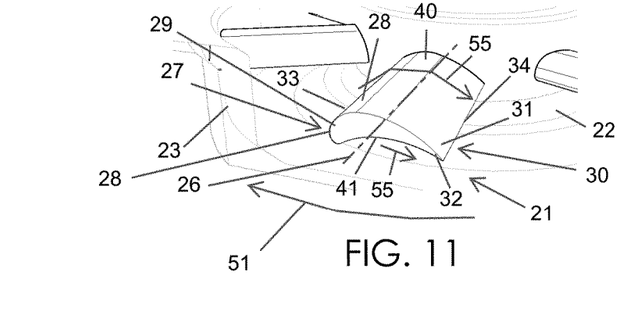
FIG. 11 is an enlarged perspective view of the airfoil strut shown in FIGS. 10 and 12, in accordance with a non-limiting exemplary embodiment of the present disclosure.
Figure 12:
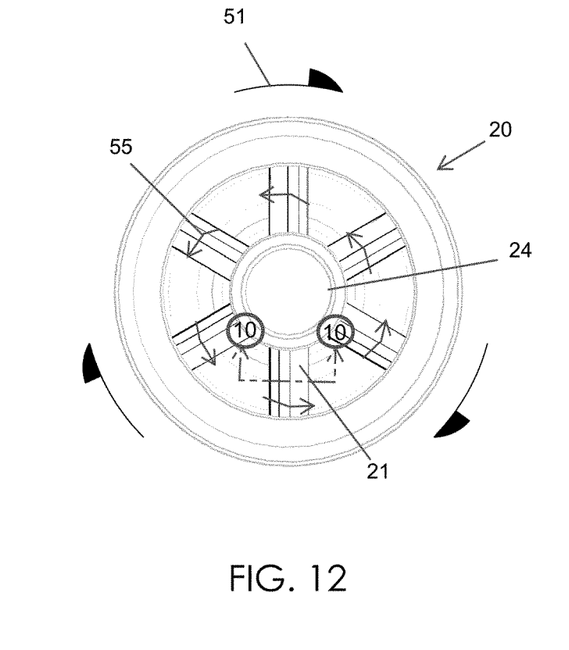
FIG. 12 is a side elevational view of a vehicle wheel including airfoil struts configured with the 10 degree angle of attack shown in FIG. 10, in accordance with a non-limiting exemplary embodiment of the present disclosure.
Figure 13:
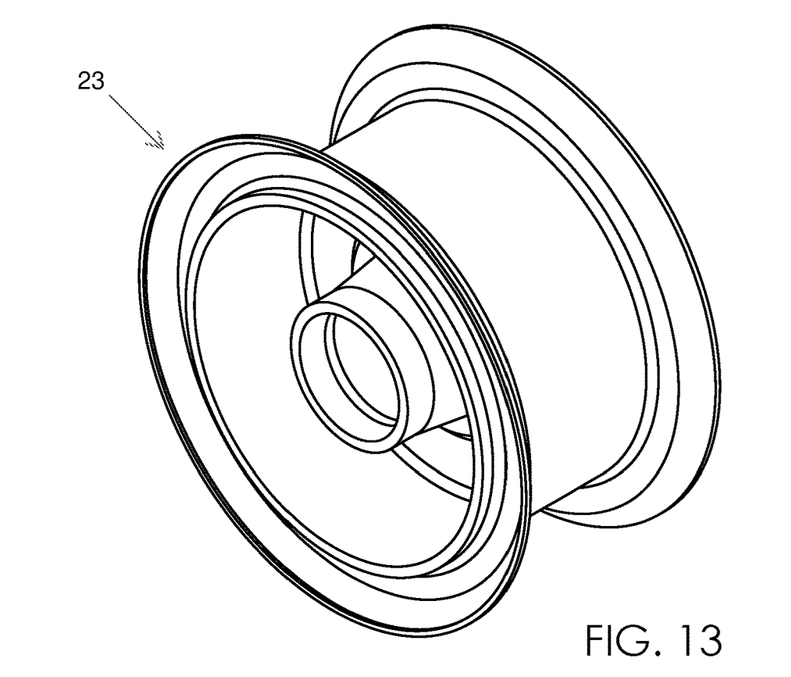
FIG. 13 is a perspective view of the vehicle rim employed by the vehicle wheel, in accordance with a non-limiting exemplary embodiment of the present disclosure.
Figure 14:
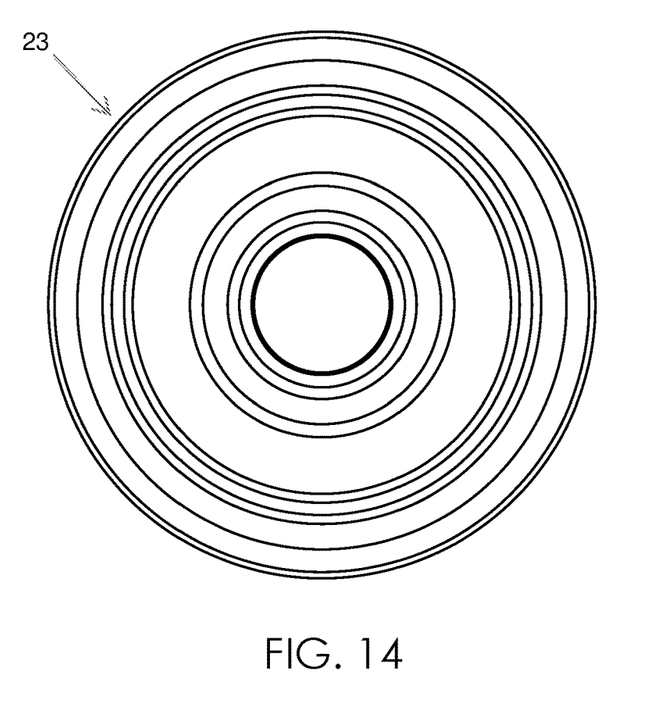
FIG. 14 is a side elevational view of the vehicle rim shown in FIG. 13.

In a non-limiting exemplary embodiment, each of the vehicle airfoil struts 21 includes an angle of attack 35 less than or equal to 10 degrees (as perhaps best shown in FIGS. 8 and 10). Such a structural configuration yields the new, useful, and unpredicted result of providing improved brake rotor 22 cooling and creating a lift for improving the vehicle MPG.

Figure 6:
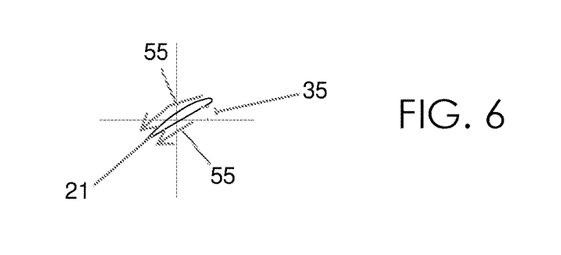
FIG. 6 is a cross-sectional view taken along line 6-6 shown in FIG. 7 for illustrating a 30 degree angle of attack of an airfoil strut, in accordance with a non-limiting exemplary embodiment of the present disclosure.
Figure 7:
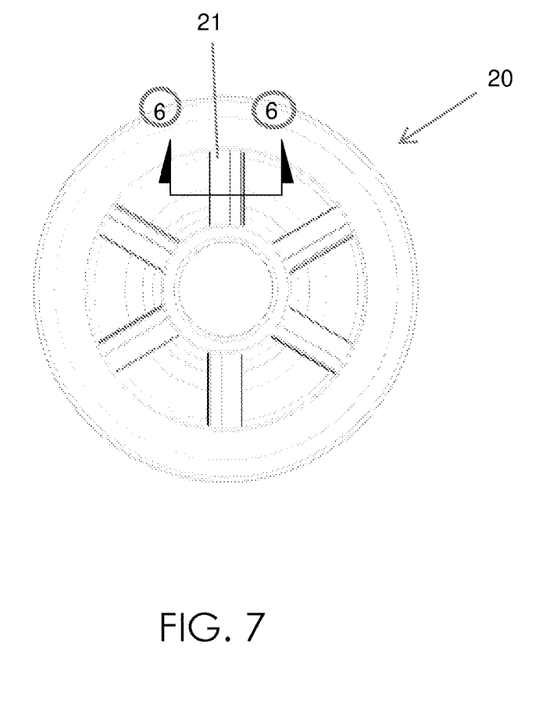
FIG. 7 is a side elevational view of a vehicle wheel including airfoil struts configured with the 30 degree angle of attack shown in FIG. 6, in accordance with a non-limiting exemplary embodiment of the present disclosure.

In a non-limiting exemplary embodiment, each of the vehicle airfoil struts 21 includes an angle of attack 35 greater than 10 degrees and less than or equal to 30 degrees (as perhaps best shown in FIG. 6). Such a structural configuration yields the new, useful, and unpredicted result of providing improved brake rotor 22 cooling and creating a lift for improving the vehicle MPG.

Figure 1:
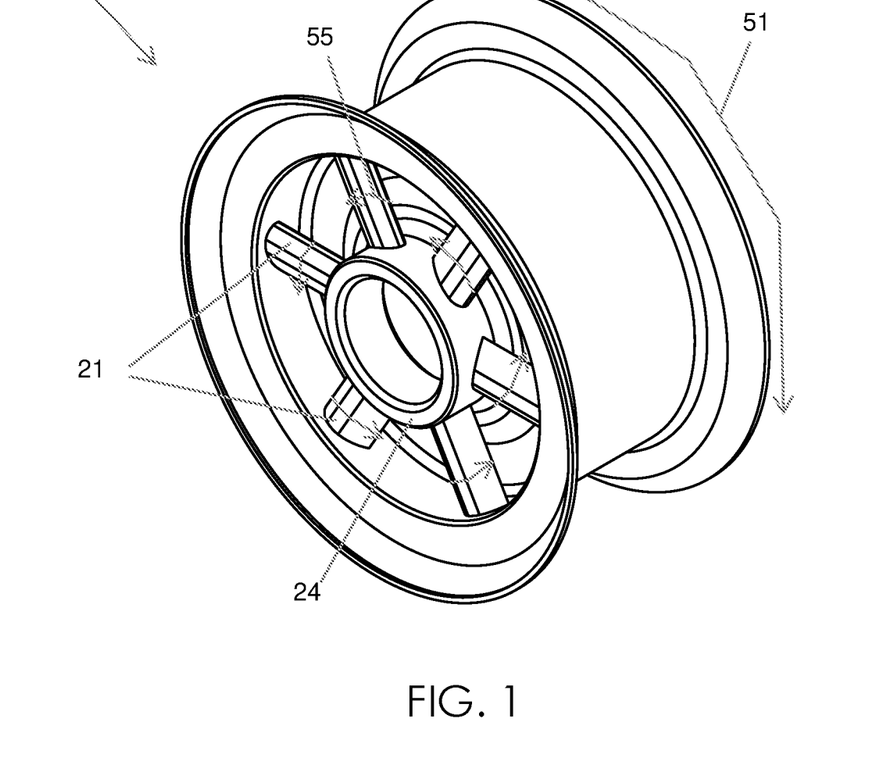
FIG. 1 is a perspective view of an aerodynamic vehicle wheel including airfoil struts, in accordance with a non-limiting exemplary embodiment of the present disclosure.
Figure 2:
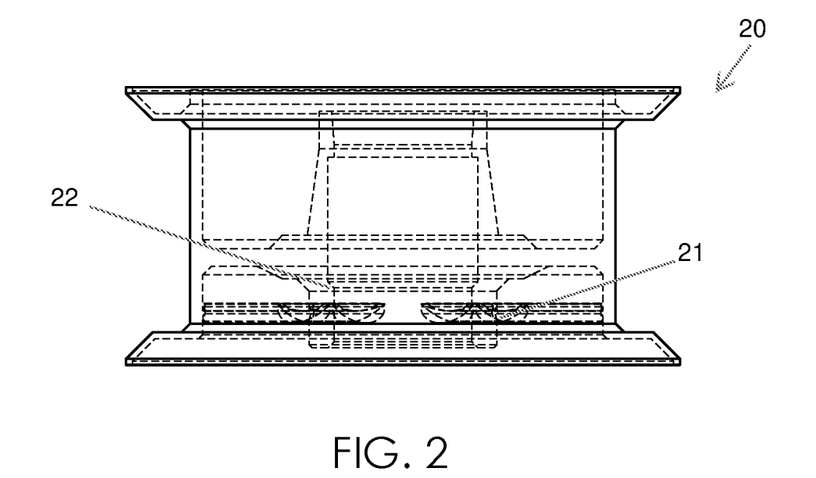
FIG. 2 is a top plan view of the vehicle wheel including airfoil struts shown in FIG. 1.
Figure 3:
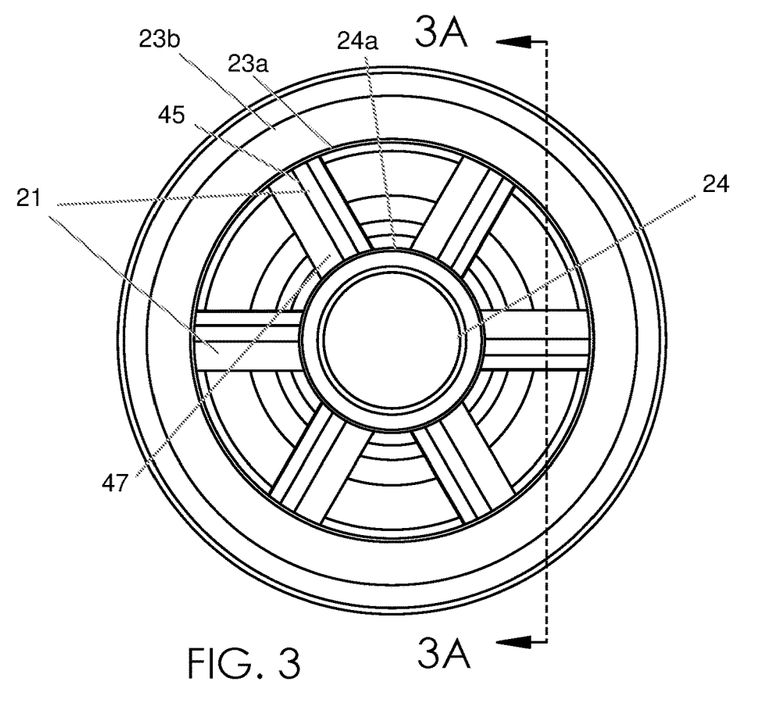
FIG. 3 is a side elevational view of the vehicle wheel including airfoil struts shown in FIG. 1.
Figure 3A:
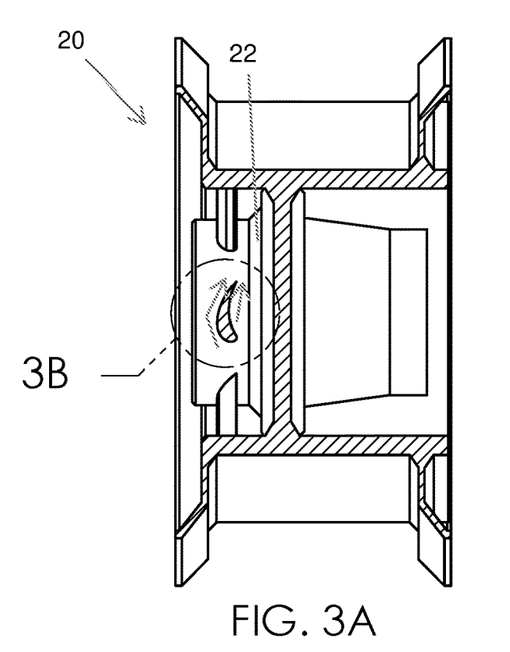
FIG. 3A is a cross-sectional view taken along line 3A-3A shown in FIG. 3.
Figure 3B:
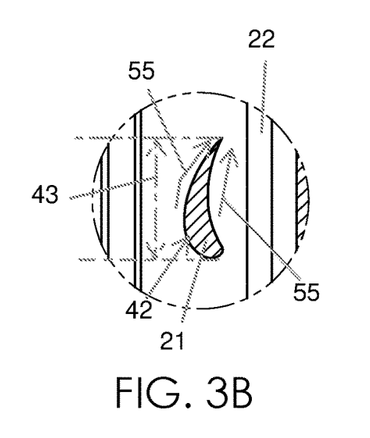
FIG. 3B is an enlarged view of section 3B shown in FIG. 3A.
Figure 4:
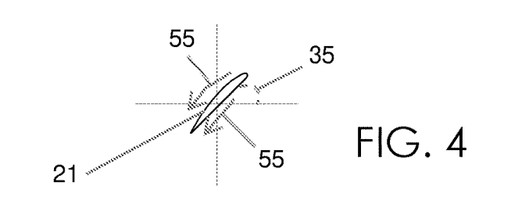
FIG. 4 is a cross-sectional view taken along line 4-4 shown in FIG. 5 for illustrating a 45 degree angle of attack of an airfoil strut, in accordance with a non-limiting exemplary embodiment of the present disclosure.
Figure 5:
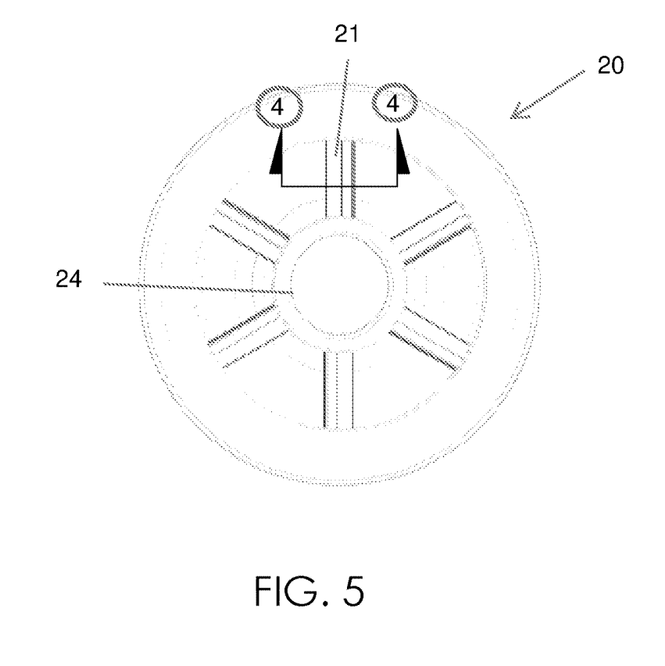
FIG. 5 is a side elevational view of a vehicle wheel including airfoil struts configured with the 45 degree angle of attack shown in FIG. 4, in accordance with a non-limiting exemplary embodiment of the present disclosure.

In a non-limiting exemplary embodiment, each of the vehicle airfoil struts 21 includes an angle of attack 35 greater than 30 degrees and less than or equal to 45 degrees (as perhaps best shown in FIG. 4). Such a structural configuration yields the new, useful, and unpredicted result of providing improved brake rotor 22 cooling and creating a lift for improving the vehicle MPG.

In a non-limiting exemplary embodiment, each of the vehicle airfoil struts 21 includes an arcuate top surface 40 and an arcuate bottom surface 41 opposed therefrom. Advantageously, the top surface 40 having a greater surface area 42 and surface area length 43 than the bottom surface 41. Such a structural configuration yields the new, useful, and unpredicted result of providing improved brake rotor 22 cooling and creating a lift for improving the vehicle MPG.

In a non-limiting exemplary embodiment, each of the vehicle airfoil struts 21 further includes a distal end 45 directly coupled to a circumferential inner perimeter 23a of an outer portion 23b the vehicle rim 23, and a proximal end 47 being directly coupled to a circumferential outer perimeter 24a of the central hub 24. Such a structural configuration yields the new, useful, and unpredicted result of providing improved brake rotor 22 cooling and creating a lift for improving the vehicle MPG.

In a non-limiting exemplary embodiment, the arcuate top surface 40 is smooth and continuously extends along both the leading section 27 and the trailing section 30. Advantageously, the arcuate bottom surface 41 is smooth and continuously extends along both the leading section 27 and the trailing section 30. Such a structural configuration yields the new, useful, and unpredicted result of providing improved brake rotor 22 cooling and creating a lift for improving the vehicle MPG.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A vehicle wheel for cooling a brake rotor of a vehicle and improving fuel efficiency of the vehicle, said vehicle wheel comprising:
   a vehicle rim having a central hub, said vehicle rim being configured to engage a vehicle tire of a vehicle and further being configured to communicate with the brake rotor of the vehicle; and
   a plurality of vehicle airfoil struts connected to said central hub and being extended radially outwardly therefrom, said vehicle airfoil struts being equidistantly spaced about said central hub;
   wherein each of said vehicle airfoil struts has a central longitudinal axis extended radially away from said central hub and includes
      a leading section facing forward and having a first curvilinear surface provided with a first radius of curvature facing a rotation direction of said vehicle rim, and
      a trailing section facing rearward and having a second curvilinear surface provided with a second radius of curvature opposing the rotation direction of said vehicle rim;

wherein said first radius of curvature is greater than said second radius of curvature;

wherein said leading section has a rectilinear leading edge extended parallel to and along the central longitudinal axis;

wherein said trailing section has a rectilinear and planar trailing edge extended parallel to and along the central longitudinal axis and said rectilinear leading edge;

wherein said leading section and said trailing section are configured to channel airflow towards the brake rotor and cool the brake rotor as well as improve fuel efficiency of the vehicle;

wherein said first radius of curvature and said second radius of curvature are configured to channel airflow towards the brake rotor and cool the brake rotor as well as improve fuel efficiency of the vehicle.

2. The vehicle wheel of claim 1, wherein said vehicle rim is a land vehicle rim.

3. The vehicle wheel of claim 1, wherein said vehicle airfoil struts are land vehicle airfoil struts.

4. The vehicle wheel of claim 3, wherein each of said vehicle airfoil struts comprises: an angle of attack less than or equal to 10 degrees.

5. The vehicle wheel of claim 3, wherein each of said vehicle airfoil struts comprises: an angle of attack greater than 10 degrees and less than or equal to 30 degrees.

6. The vehicle wheel of claim 3, wherein each of said vehicle airfoil struts comprises: an angle of attack greater than 30 degrees and less than or equal to 45 degrees.

7. The vehicle wheel of claim 3, wherein each of said vehicle airfoil struts comprises: an arcuate top surface and an arcuate bottom surface opposed therefrom, said top surface having a greater surface area and surface area length than said bottom surface.

8. The vehicle wheel of claim 7, wherein each of said vehicle airfoil struts further comprises:

a distal end directly coupled to a circumferential inner perimeter of an outer portion of said vehicle rim; and a proximal end being directly coupled to a circumferential outer perimeter of said central hub.

9. The vehicle wheel of claim 7, wherein said arcuate top surface is smooth and continuously extends along both of said leading section and said trailing section, wherein said arcuate bottom surface is smooth and continuously extends along both of said leading section and said trailing section.

10. A vehicle wheel for cooling a brake rotor of a vehicle and improving fuel efficiency of the vehicle, said vehicle wheel comprising:

a vehicle rim having a central hub, said vehicle rim being configured to engage a vehicle tire of a vehicle and further being configured to communicate with the brake rotor of the vehicle; and a plurality of vehicle airfoil struts connected to said central hub and being extended radially outwardly therefrom, said vehicle airfoil struts being equidistantly spaced about said central hub;

wherein each of said vehicle airfoil struts has a central longitudinal axis extended radially away from said central hub and includes a leading section facing forward and having a first curvilinear surface provided with a first radius of curvature facing a rotation direction of said vehicle rim, and a trailing section facing rearward and having a second curvilinear surface provided with a second radius of curvature opposing the rotation direction of said vehicle rim;

wherein said first radius of curvature is greater than said second radius of curvature;

wherein said leading section has a rectilinear leading edge extended parallel to and along the central longitudinal axis;

wherein said trailing section has a rectilinear and planar trailing edge extended parallel to and along the central longitudinal axis and said rectilinear leading edge;

wherein said rectilinear and planar trailing edge has a cross-sectional thickness less than a cross-sectional thickness of said rectilinear leading edge;

wherein said leading section and said trailing section are configured to channel airflow towards the brake rotor and cool the brake rotor as well as improve fuel efficiency of the vehicle;

wherein said first radius of curvature and said second radius of curvature are configured to channel airflow towards the brake rotor and cool the brake rotor as well as improve fuel efficiency of the vehicle.

11. The vehicle wheel of claim 10, wherein said vehicle rim is a land vehicle rim.

12. The vehicle wheel of claim 10, wherein said vehicle airfoil struts are land vehicle airfoil struts.

13. The vehicle wheel of claim 12, wherein each of said vehicle airfoil struts comprises: an angle of attack less than or equal to 10 degrees.

14. The vehicle wheel of claim 12, wherein each of said vehicle airfoil struts comprises: an angle of attack greater than 10 degrees and less than or equal to 30 degrees.

15. The vehicle wheel of claim 12, wherein each of said vehicle airfoil struts comprises: an angle of attack greater than 30 degrees and less than or equal to 45 degrees.

16. The vehicle wheel of claim 12, wherein each of said vehicle airfoil struts comprises: an arcuate top surface and an arcuate bottom surface opposed therefrom, said top surface having a greater surface area and surface area length than said bottom surface.

17. The vehicle wheel of claim 16, wherein each of said vehicle airfoil struts further comprises:

a distal end directly coupled to a circumferential inner perimeter of an outer portion of said vehicle rim; and a proximal end being directly coupled to a circumferential outer perimeter of said central hub.

18. The vehicle wheel of claim 16, wherein said arcuate top surface is smooth and continuously extends along both of said leading section and said trailing section, wherein said arcuate bottom surface is smooth and continuously extends along both of said leading section and said trailing section.

* * * * *